United States Patent
Saeki

(10) Patent No.: US 11,548,589 B2
(45) Date of Patent: Jan. 10, 2023

(54) MOTORCYCLE

(71) Applicant: KAWASAKI MOTORS, LTD., Akashi (JP)

(72) Inventor: Daisuke Saeki, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 939 days.

(21) Appl. No.: 16/378,801

(22) Filed: Apr. 9, 2019

(65) Prior Publication Data
US 2020/0017164 A1 Jan. 16, 2020

(30) Foreign Application Priority Data
Jul. 11, 2018 (JP) .............................. JP2018-131356

(51) Int. Cl.
| | |
|---|---|
| *B62M 6/50* | (2010.01) |
| *B62J 45/41* | (2020.01) |
| *B62J 45/415* | (2020.01) |
| *B62J 45/423* | (2020.01) |
| *B62J 6/01* | (2020.01) |

(Continued)

(52) U.S. Cl.
CPC ................ *B62M 6/50* (2013.01); *B62J 6/01* (2020.02); *B62J 6/05* (2020.02); *B62J 45/41* (2020.02); *B60Q 2300/134* (2013.01); *B60Q 2300/136* (2013.01); *B60W 40/103* (2013.01); *B60W 40/112* (2013.01); *B60W 40/114* (2013.01); *B60W 2300/36* (2013.01); *B60W 2420/42* (2013.01); *B62J 6/022* (2020.02); *B62J 45/4151* (2020.02); *B62J 45/423* (2020.02)

(58) Field of Classification Search
CPC ................ B62M 6/50; B62M 45/4151; B60Q 2300/134; B60Q 2300/136; B60W 40/103; B60W 40/112; B60W 40/114; B60W 2300/36; B60W 2402/42
See application file for complete search history.

(56) References Cited

U.S. PATENT DOCUMENTS

| | | | |
|---|---|---|---|
| 7,648,000 B2* | 1/2010 | Kimura ................ | B62K 21/005 180/219 |
| 10,821,882 B2* | 11/2020 | Hamlin ................ | B60Q 11/005 |

(Continued)

FOREIGN PATENT DOCUMENTS

| | | |
|---|---|---|
| DE | 102018104324 | 5/2018 |
| JP | 5837029 | 12/2015 |

(Continued)

*Primary Examiner* — Tony H Winner
(74) *Attorney, Agent, or Firm* — Fay Kaplun & Marcin, LLP

(57) ABSTRACT

A motorcycle includes a pair of left and right front forks, a headlight, cover members (side cowls and light covers), and camera units. A front wheel is rotatably attached to the pair of left and right front forks. The headlight irradiates a forward side. The cover members each having an internal space are disposed at least laterally outside the pair of left and right front forks in a front view. The camera units detect the forward side by acquiring visible light which is one kind of electromagnetic waves (by acquiring images). In a front view, the camera units are disposed below the headlight and laterally outside the pair of left and right front forks. The camera units are disposed in the internal spaces of the cover members.

11 Claims, 6 Drawing Sheets

(51) Int. Cl.
  *B62J 6/05* (2020.01)
  *B60W 40/112* (2012.01)
  *B60W 40/114* (2012.01)
  *B60W 40/103* (2012.01)
  *B62J 6/022* (2020.01)

(56) References Cited

U.S. PATENT DOCUMENTS

2015/0329072 A1    11/2015  Freienstein et al.
2017/0327026 A1    11/2017  Suzuki et al.
2018/0162265 A1     6/2018  Iwamoto
2020/0237819 A1*    7/2020  Slanetz .................. A61K 35/17
2020/0377165 A1*   12/2020  Rienmueller ............ B62J 6/055

FOREIGN PATENT DOCUMENTS

| | | |
|---|---|---|
| JP | 2017-39487 | 2/2017 |
| JP | 2017-039488 | 2/2017 |
| JP | 2018-94945 | 6/2018 |
| WO | 2017/221410 | 12/2017 |

\* cited by examiner

MOTORCYCLE

BACKGROUND OF THE INVENTION

1. Field of the Invention

The present invention generally relates to a motorcycle including a forward detector that detects the forward side by acquiring sounds or electromagnetic waves.

2. Description of the Related Art

A motorcycle known to date includes a camera unit for detecting the forward side. Motorcycles of this type are disclosed in PCT Publ. Appln. No. WO2017/221410 and Japanese Patent No. 5837029.

PCT Publ. Appln. No. WO2017/221410 discloses a structure having a camera unit attached to a mount rail which is disposed in an upper cowl. Japanese Patent No. 5837029 discloses a structure having a camera unit attached in a housing of a headlight.

SUMMARY OF THE INVENTION

In many cases, however, a headlight, a light stay, and other components, each of which has a relatively large size, are disposed in an upper cowl. Moreover, the upper cowl is often formed with a tapered shape for visual and aerodynamic reasons. Furthermore, a forward detector constituted by a camera or the like acquires sounds or electromagnetic waves to detect the forward side, and therefore any member that blocks sounds or electromagnetic waves cannot be disposed ahead of the forward detector.

This is why the forward detector needs to be disposed in a place other than the upper cowl. Here, the headlight, which is always on and emits a large quantity of light, has a large heating value. Thus, arranging the forward detector in a housing of the headlight requires an adequate countermeasure against heat.

The present invention has been accomplished in view of the circumstances described above, and a primary object of the present invention is to provide a motorcycle including a forward detector that is attached at a position different from conventional positions.

Problems to be solved by the present invention are as stated above. Solutions to the problems and their advantageous effects will now be described below.

An aspect of the present invention provides a motorcycle configured as follows. The motorcycle includes a pair of left and right front forks, a headlight, a cover member, and a forward detector. A front wheel is rotatably attached to the pair of left and right front forks. The headlight irradiates a forward side. The cover member is disposed at least laterally outside the pair of left and right front forks in a front view, and has an internal space. The forward detector detects the forward side by acquiring sounds or electromagnetic waves. In a front view, the forward detector is disposed below the headlight and laterally outside the pair of left and right front forks. The forward detector is disposed in the internal space of the cover member.

Accordingly, a region below the headlight and laterally outside the front forks can be effectively used to arrange the forward detector. Since the forward detector is disposed in the internal space of the cover member, the forward detector can have just a simplified or even no waterproof structure. Particularly for a motorcycle, which has its many portions exposed to the outside, the waterproof structure is of great necessity and significance, and therefore this configuration exerts higher effectiveness.

The present invention can provide a motorcycle including a forward detector that is attached at a position different from conventional positions.

DETAILED DESCRIPTION OF THE PREFERRED EMBODIMENTS

Hereinafter, some embodiments of the present invention will be described with reference to the drawings. In descriptions below, front, rear, left, and right directions are defined relative to a direction in which a motorcycle 1 travels forward being defined as the front. In other words, the left and right directions are defined based on the view from a rider riding on the motorcycle 1. Thus, the front-rear direction (longitudinal direction) is identical to a vehicle-length direction, and the left-right direction (lateral direction) is identical to a vehicle-width direction. The vertical direction (up-down direction) is identical to a height direction.

Figure 1:
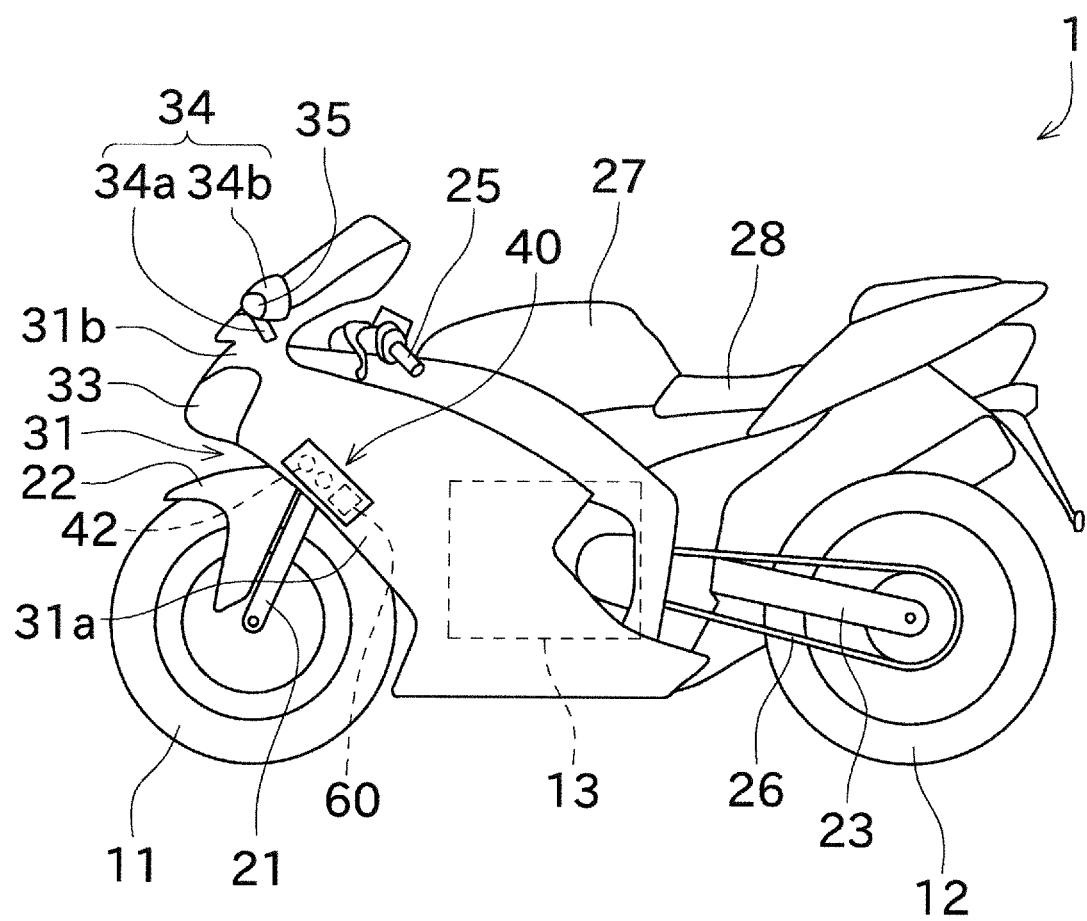
FIG. 1 is a side view of a motorcycle according to a first embodiment.
Figure 2:
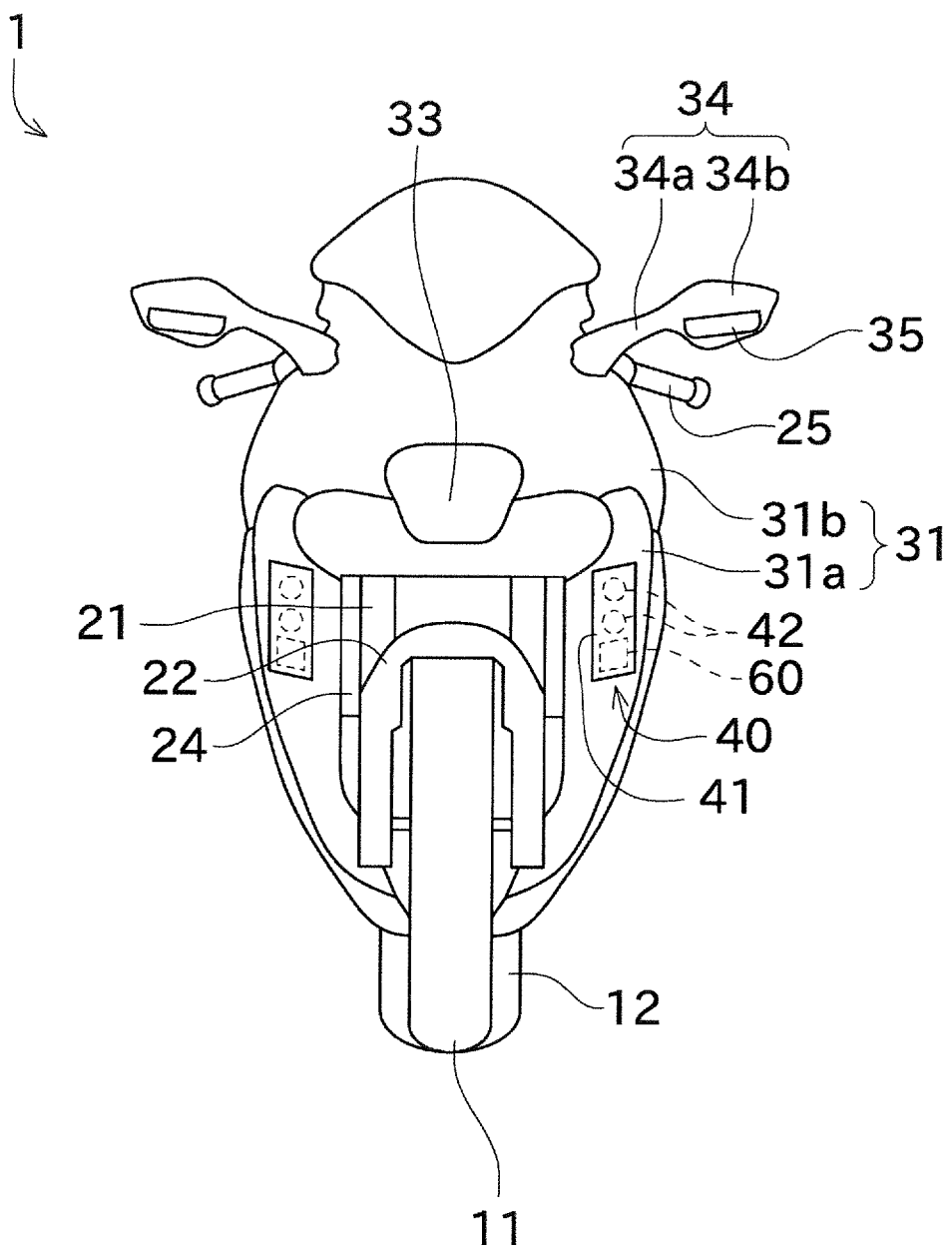
FIG. 2 is a front view of the motorcycle.

First, outline of the motorcycle 1 will be described with reference to FIG. 1 and FIG. 2. FIG. 1 is a side view of the motorcycle 1. FIG. 2 is a front view of the motorcycle 1. As shown in FIG. 1, the motorcycle 1 includes a front wheel 11, a rear wheel 12, and an engine 13.

Front forks 21 are attached to a front portion of a vehicle body frame via upper and lower brackets (not shown). The front forks 21 are a pair of left and right front forks arranged with the front wheel 11 interposed between them in a front view. The front wheel 11 is rotatably attached to lower portions of the front forks 21.

A front fender 22 is disposed near the front wheel 11. As shown in FIG. 2, the front fender 22 is arranged so as to cover the front wheel 11 from its outer side with respect to the vehicle-width direction and from its upper side with respect to the height direction. The front fender 22 is arranged so as to overlap the front forks 21 in a front view.

Swing arms 23 are disposed in a rear portion of the vehicle body frame. The rear wheel 12 is rotatably attached to rear portions of the swing arms 23. Power generated by the engine 13 is transmitted to the rear wheel 12 via a drive chain 26 which is attached to the rear wheel 12. The front wheel 11 and the rear wheel 12 are running wheels for making the vehicle body of the motorcycle 1 travel.

A radiator 24 is disposed at the rear of the front wheel 11 and the front forks 21. Cooling water (coolant) for cooling the engine 13 flows inside the radiator 24. The radiator 24 releases heat from the cooling water by heat exchange between the cooling water and outdoor air.

A steering handle 25 is disposed near the upper ends of the front forks 21. As a rider rotates the steering handle 25, the front forks 21 are rotated to make the motorcycle 1 turn. A fuel tank 27 for storing a fuel to be supplied to the engine 13 is disposed at the rear of the steering handle 25 and above the engine 13. A front seat 28 for the rider to be seated thereon is disposed at the rear of the fuel tank 27.

The motorcycle 1 has a cowl 31 on its surface. The cowl 31 is made of a resin material that allows electromagnetic waves having a frequency used for a radar, etc. to be transmitted therethrough. The cowl 31 is provided for the purpose of, for example, reducing the air resistance of the motorcycle 1, protecting components of the motorcycle 1, and improving the external appearance. The cowl 31 includes a plurality of cowl members. Herein, a pair of left and right portions of the cowl 31, which are visible in a front view, will be referred to as side cowls (cover members) 31a. The side cowls 31a are spaced from each other with the front wheel 11 and the front forks 21 disposed therebetween. A portion of the cowl 31 located above the side cowl 31a will be referred to as an upper cowl (front cowl) 31b.

The upper cowl 31b may have, in its lower portion, a pair of left and right intake ports. The motorcycle 1 having such a configuration is provided with intake paths (ducts) that connect the intake ports to an air cleaner (not shown). With this configuration, ram air introduced from the intake ports is supplied to the engine, which can raise the intake pressure.

As shown in FIG. 1, a headlight 33 is disposed in a front portion of the motorcycle 1 and at a position higher than the front wheel 11 with respect to the height direction. The headlight 33 is disposed at the lateral center. The headlight 33 is configured such that light from a light source is reflected by a reflector to be emitted to the forward side through a light-transmitting lens. The headlight 33 is arranged in an internal space of the upper cowl 31b with the lens exposed from the upper cowl 31b. Alternatively, the headlight 33 may be arranged with the whole of the headlight 33 exposed out of the cowl 31. Alternatively, the upper cowl 31b may be omitted. The headlight 33 is configured to be always on while the engine 13 is operating or the vehicle is traveling. As shown in FIG. 2, the headlight 33 of this embodiment is disposed at one position which is a center position with respect to the vehicle-width direction. Instead of this, the headlight 33 may have a pair of left and right headlights arranged in a bilaterally symmetrical fashion, for example.

A pair of left and right sideview mirrors 34 are disposed above the headlight 33. Each of the sideview mirrors 34 includes an extending-out portion 34a and a mirror portion 34b. The extending-out portion 34a extends outward from the upper cowl 31b in the vehicle-width direction. The mirror portion 34b is connected to a distal end portion of the extending-out portion 34a. The mirror portion 34b has a mirror (not shown) which faces rearward. The sideview mirrors 34 may be attached to other positions (for example, to the steering handle 25).

The pair of left and right sideview mirrors 34 respectively have direction indicators 35. The direction indicators 35 provided in the sideview mirrors 34 are arranged at positions visible in a front view and in a side view. The direction indicators 35 blink in response to a rider's operation at a time of right or left turn, lane changing, or the like. The direction indicators 35 may sometimes be used as hazard-warning lights. The direction indicators 35 may be attached to parts other than the sideview mirrors 34 (for example, to the cowl 31 or to the headlight 33).

Figure 3:
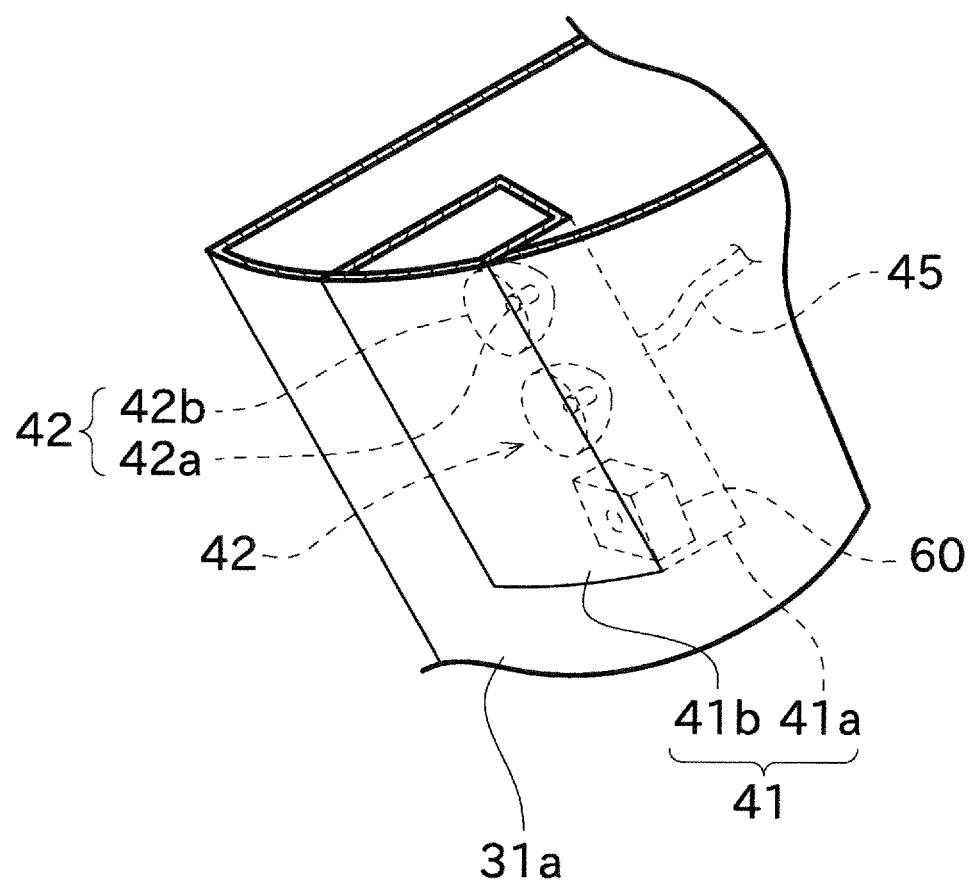
FIG. 3 is a schematic perspective view of a side cowl.

The pair of left and right side cowls 31a respectively have internal spaces in each of which cornering light (lighting equipment) 40 is disposed. The internal space of the side cowl 31a means a space interposed between plate-shaped cowl members which are located laterally inward and outward, respectively, as shown in FIG. 3. The cornering light 40 is arranged in a relatively upper region in the side cowl 31a. More specifically, the cornering light 40 is arranged such that at least a part of the cornering light 40 is above the front wheel 11 and the front fender 22. In a front view, the length of the side cowl 31a with respect to the vehicle-width direction decreases toward the bottom (in other words, the length with respect to the vehicle-width direction increases so that the space widens toward the top). Since the position of the cornering light 40 is set in a relatively upper region, it is possible to secure a space for arranging the cornering light 40.

As shown in FIG. 3, the cornering light 40 includes a light cover (cover member) 41 and a plurality of light emitters 42. The light cover 41 collectively covers the plurality of light emitters 42. The light cover 41 includes a housing 41a and a lens 41b. The cornering light 40 is arranged in the internal space of the side cowl 31a with the lens 41b exposed to the outside. In this embodiment, the cornering light 40 is attached to the cowl member of the side cowl 31a, the cowl member being located outward with respect to the vehicle-width direction. Alternatively, the cornering light 40 may be attached to the cowl member located inward with respect to the vehicle-width direction.

The housing 41a is a member to which components such as the light emitters 42 are attached. A power cable 45 that supplies electric power for turning on the light emitters 42 is attached via the housing 41a. The lens 41b is disposed in a front portion of the cornering light 40. The lens 41b is made of a material that allows light produced by the light emitters 42 to be transmitted therethrough. Each of the light emitters 42 includes a light source 42a such as an LED, and a reflector 42b that reflects light produced by the light source 42a.

Figure 4:
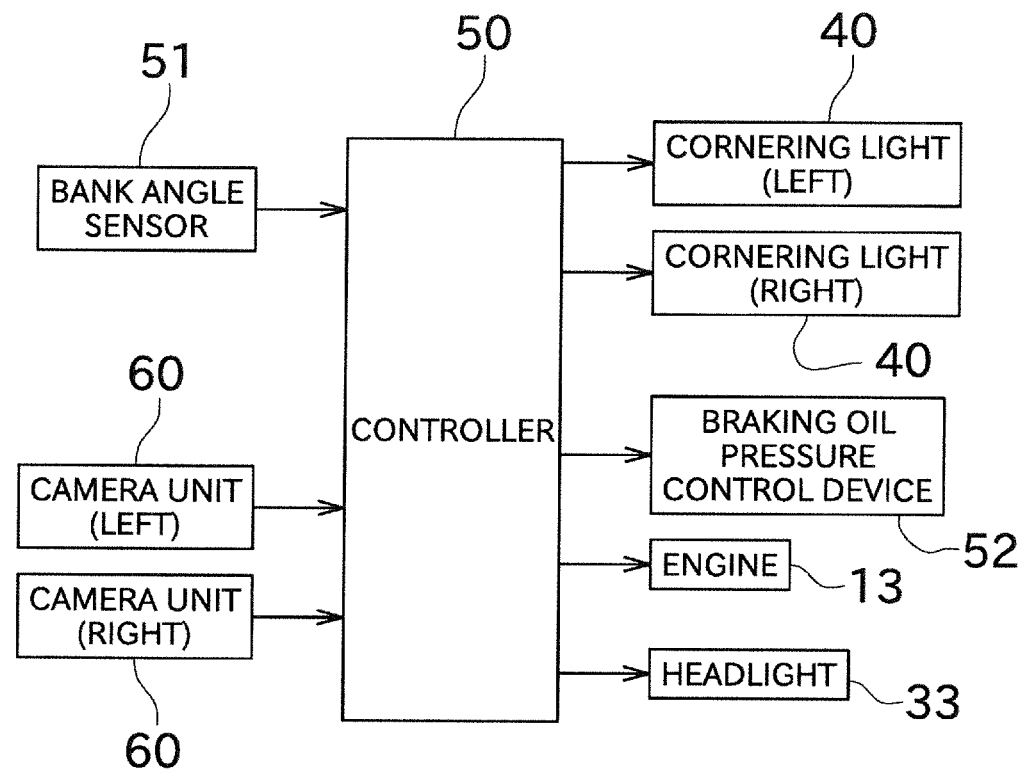
FIG. 4 is a block diagram showing devices for controls in relation to cornering lights and camera units.

As shown in FIG. 4, the motorcycle 1 includes a bank angle sensor 51 that detects a bank angle. The bank angle means a tilt angle of the motorcycle 1 tilting about a rotation axis that is parallel to the vehicle-length direction. More specifically, the bank angle means an angle formed between the vehicle-height direction of the tilting motorcycle 1 and the direction perpendicular to a road surface. A bank angle detected by the bank angle sensor 51 is outputted to a controller 50 shown in FIG. 4.

The controller 50 is a circuit board with electronic components attached thereto. The controller 50 may be disposed either inside or outside the cornering light 40. When the motorcycle 1 banks left, the controller 50 turns on the light emitters 42 of the left-hand cornering light 40 (the same is true for the right side). Which light emitter 42 is to be turned on by the controller 50 may be changed depending on the magnitude of the bank angle. For example, it may be acceptable that the controller 50 turns on the lowermost light emitter 42 in a case of a small bank angle, and additionally turns on the upper light emitters 42 as the bank angle increases. In this embodiment, the light emitters 42 are arranged one above another in the vertical direction. Instead, the light emitters 42 may be arranged side by side in the vehicle-width direction, or may be arranged side by side in the vertical and vehicle-width directions (i.e., side by side in a diagonal direction).

The pair of left and right cornering lights 40 respectively have camera units (forward detectors) 60. Each of the camera units 60 is attached to the housing 41a. The camera unit 60 is disposed below the plurality of light emitters 42. That is, the light emitters 42 can be disposed at a relatively upper position. This enables the light emitters 42 to emit light farther at a time of turning. The camera unit 60, which mainly includes an image sensor for detecting visible light, acquires an image forward of the motorcycle 1. The camera unit 60 is supplied with electric power via the power cable 45 mentioned above. In other words, the power cable is shared between the light emitters 42 and the camera unit 60.

If the camera unit 60 was disposed at a position remote from other electrical equipment, it would be necessary to place a power cable dedicated for supplying electric power to the camera unit 60. In this respect, attaching the camera unit 60 to the same position as the position where other electrical equipment is attached (to the same housing 41*a* where other electrical equipment is attached) as illustrated in this embodiment allows sharing of the power cable 45, and thus allows the power cable 45 to be placed in a simple fashion.

An image acquired by each camera unit 60 is outputted to the controller 50. In this embodiment, a pair of left and right camera units 60 are provided. The controller 50 carries out analysis based on images acquired by the camera units 60 and the distance between the camera units 60, and thereby can calculate a distance to an object contained in the acquired images. Hardware for controlling the cornering lights 40 and hardware for carrying out image analysis may be either the same or different.

A signal related to the control of each cornering light 40 (e.g., a signal indicating a result of detection of the bank angle, or a signal for switching whether or not to turn on the cornering light 40) is transmitted and received through Controller Area Network (CAN) communication. A signal related to the control of each camera unit 60 (a signal indicating an acquired image, a signal indicating a result of image analysis, and a signal for controlling each part in accordance with a result of image analysis) is transmitted and received through the CAN communication, too. Thus, the cornering light 40 and the camera unit 60 share a signal cable as well as the power cable.

The controller 50 performs a vehicle body control based on detection results obtained by the pair of left and right camera units 60. The vehicle body control is to control any component included in the motorcycle 1. In the following description, a vehicle body control based on detection results obtained by the camera units 60 may be simply referred to as "vehicle body control". Examples of the control performed by the controller 50 include: (1) cruise control; (2) collision avoidance control; and (3) low-beam/high-beam switching control. The controls described herein are merely examples. Another vehicle body control may be performed based on detection results obtained by the camera units 60.

The cruise control is a control of: measuring a distance (separation distance) to a vehicle ahead based on detection results obtained by the camera units 60; and adjusting a vehicle speed based on the separation distance (so as to keep the separation distance constant, for example). The controller 50 adjusts the vehicle speed by controlling the engine 13 or a braking oil pressure control device 52. The braking oil pressure control device 52 is a device that adjusts an oil pressure under which oil is supplied to a brake through a brake hose.

The collision avoidance control is a control of: measuring a distance (separation distance) to an obstacle ahead or a vehicle ahead based on detection results obtained by the camera units 60; and braking the motorcycle 1 based on the separation distance (if the separation distance rapidly decreases, for example). The controller 50 brakes the motorcycle 1 by controlling the braking oil pressure control device 52, for example.

The low-beam/high-beam switching control is a control of: measuring the position of an oncoming vehicle, light emitted from a headlight of the oncoming vehicle, the position of a vehicle traveling ahead, or the like, based on detection results obtained by the camera units 60; and switching the headlight 33 between low beam and high beam based on a result of the measurement. For example, if the distance to an oncoming vehicle or to a vehicle traveling ahead is long, or if the controller 50 has not detected light emitted from a headlight of the oncoming vehicle, the controller 50 sets the headlight 33 to high beam; and otherwise, the controller 50 sets the headlight 33 to low beam.

The three vehicle body controls described above are not performed while the motorcycle 1 is turning (traveling in a curve, changing a lane, or turning right or left), because under such a situation the rider would be driving with attention to surroundings. While the motorcycle 1 is turning, images acquired by the camera units 60 largely change, and thus it may not be possible to appropriately perform the three vehicle body controls described above. In this embodiment, therefore, the three vehicle body controls described above are performed only while the motorcycle 1 is traveling straight. Whether or not the motorcycle 1 is traveling straight is determined based on detection results obtained by, for example, a position sensor such as a Global Navigation Satellite System (GNSS) sensor, an accelerometer such as an inertial measurement unit (IMU), and the bank angle sensor 51.

The following description deals with detailed position and configuration of the camera units 60 of this embodiment, and advantageous effects exerted thereby.

The camera units 60 of this embodiment are arranged not in the upper cowl 31*b* but in the side cowls 31*a*. The upper cowl 31*b*, which has a tapered shape for enabling reduction in the air resistance, provides a limited space available for placing components. Particularly in this embodiment, the headlight 33 is provided in the upper cowl 31*b*. This further narrows a space available for placing the camera units 60. In addition, the camera units 60 need to be exposed on a front surface because of their function of detecting the forward side. In this regard as well, a restriction is put on the position where the camera unit 60 can be attached. In a case where the intake ports are formed in the upper cowl 31*b*, the intake paths that connect the intake ports to the air cleaner are also formed inside the upper cowl 31*b*, which further limits the space available for placing the camera units 60.

In the side cowl 31*a*, though it has a tapered shape, a space having a certain width is formed between the cowl members which are located inward and outward with respect to the vehicle-width direction. Thus, it is easy to provide a space for placing the camera unit 60. In addition, in a case of using a pair of left and right camera units 60 to detect the forward side, the accuracy of detection is likely to increase when the distance between the left and right camera units 60 is long. Since a pair of left and right side cowls 31*a* are provided with the pair of left and right front forks 21 interposed therebetween, the left and right camera units 60 can be arranged at a distance from each other.

Even though there is a space inside the side cowls 31*a* with respect to the vehicle-width direction or below the upper cowl 31*b*, this space serves as a path through which ram air flows toward the radiator 24. Arranging a component in this space is not desirable because it may lower the efficiency of cooling the engine 13. In this regard as well, it is preferable that the camera unit 60 is arranged in the side cowl 31*a*. In the motorcycle 1 of this embodiment, the cornering lights 40 and the camera units 60 are arranged so as not to overlap the radiator 24 in a front view.

Attaching the camera units 60 to the front fender 22 is not impossible, but it increases the size of the front fender 22, which may undesirably narrow the path through which the ram air flows toward the radiator 24. Moreover, the front fender 22 is rotated integrally with the steering handle 25, the front wheel 11, and the like. Thus, every time steering is carried out, an imaging range of each camera unit 60 changes. This may make the above-described vehicle body controls difficult. In this respect, even when the steering handle 25 is rotated, the upper cowls 31b do not move. That is, the imaging range of each camera unit 60 does not change. Thus, the vehicle body controls described above can be performed appropriately.

The camera unit 60 of this embodiment is arranged within the light cover 41 of the cornering light 40. Lighting equipment such as the cornering light 40, which needs to be waterproof, is given a waterproof structure. Thus, arranging the camera unit 60 within the light cover 41 allows the camera unit 60 to have just a simplified or even no waterproof structure.

The lighting equipment such as the cornering light 40 is also given a vibration-proof structure (e.g., rubber mount), in order to reduce a load on a device which may be caused by vibration or to reliably prevent a position shift or the like which may be caused by vibration. The camera unit 60 itself is a precision instrument. It therefore is desirable to avoid transmitting much vibration to the camera unit 60. Occurrence of a position shift of the camera unit 60 may adversely affect the accuracy of detection, because the distance to an object ahead is obtained by using relative positions of the left and right camera units 60. Thus, preventing a position shift is a matter of great importance for the camera unit 60, too. In this embodiment, the vibration-proof structure of the cornering light 40 provides vibration-proofness to the camera unit 60, too, and therefore the camera unit 60 can have just a simplified or even no vibration-proof structure.

The cornering light 40 may be configured to have its optical axis adjustable. In this configuration, it is preferable that the orientation of the camera unit 60 remains unchanged when the optical axis of the cornering light 40 is adjusted. If, for example, not the cornering light 40 as a whole but the orientation in which the light emitters 42 are attached is made changeable, the orientation of the light emitters 42 alone can be adjusted. This enables the optical axis of the cornering light 40 to be adjusted without changing the imaging range of the camera unit 60.

For example, arranging the camera unit 60 within a light cover of the headlight 33 involves a risk that the camera unit 60 may fail to appropriately acquire an image due to light emitted from the headlight 33. This configuration requires that, for example, a light emitter of the headlight 33 and the camera unit 60 be separated from each other by a partition plate or the like. Moreover, the headlight 33, which is always on, tends to have a large heating value. Thus, a structure for protecting the camera unit 60 from heat of the headlight 33 may be required.

In this respect, the cornering light 40 is basically turned on only at a time of turning. At the time of turning, the vehicle body controls described above are not performed. Thus, it is not necessary to hold light emitted from the cornering light 40 from entering the camera unit 60. In this embodiment, therefore, a partition plate that separates the camera unit 60 from the light emitters 42 of the cornering light 40 is not provided. This allows the camera unit 60 to be placed in a light bar of the lighting equipment, while achieving a simple configuration of the lighting equipment. In addition, the cornering light 40 is not always on, and thus its heating value tends not to be so large. Accordingly, the camera unit 60 can be provided with just a simplified or even no countermeasure against heat.

Furthermore, it is preferable that the light emitters 42 of the cornering light 40 are disposed at a high position such that they can appropriately irradiate the forward side at a time of turning. The higher the position where the camera unit 60 is attached is, the larger the position of the camera unit 60 changes at a time of banking (i.e., the camera unit 60 moves over a longer distance though its tilt angle remains unchanged). While the motorcycle 1 is turning, the vehicle body controls described above are not performed. While, however, the motorcycle 1 is banking to a slight extent for adjusting a traveling position, the vehicle body controls described above are performed. To reduce a change of the imaging range under such a situation, the camera unit 60 is preferably attached at a low position. Since the optimum positions of the cornering light 40 and the camera unit 60 are opposite to each other with respect to the vertical direction, the optimum layout can be achieved by arranging the cornering light 40 above the camera unit 60.

Figure 5:
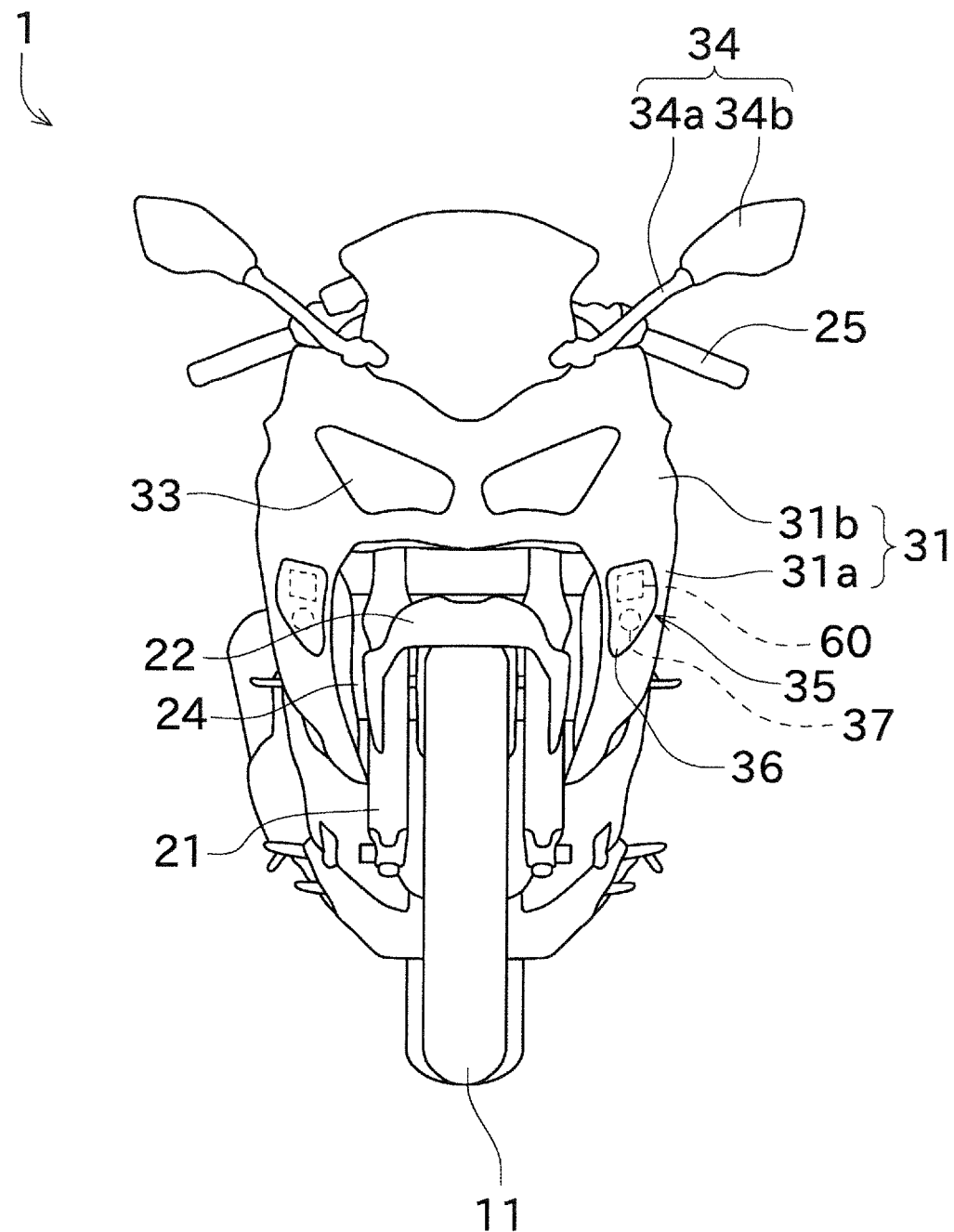
FIG. 5 is a front view of a motorcycle according to a second embodiment.

A second embodiment will now be described. FIG. 5 is a front view of a motorcycle 1 according to the second embodiment. In the description of the second embodiment, members identical or similar to those of the first embodiment will be denoted by the same reference signs on the drawings, and their description may be omitted.

In the second embodiment, a pair of left and right direction indicators 35 are attached to the side cowls 31a. Like the cornering light 40 of the first embodiment, the direction indicator 35 includes a light cover (cover member) 36 and a light emitter 37. The light cover 36 includes a housing and a lens. A camera unit 60 is covered with the light cover 36.

The camera unit 60 of the second embodiment is arranged at the same position as that in the first embodiment, and thus the same advantageous effects can be exerted. Like the cornering light 40, the direction indicator 35 is turned on only at a time of turning or immediately before turning. As for countermeasures against light and heat as well, the direction indicator 35 can exert the same advantageous effects as those in the first embodiment.

Figure 6:
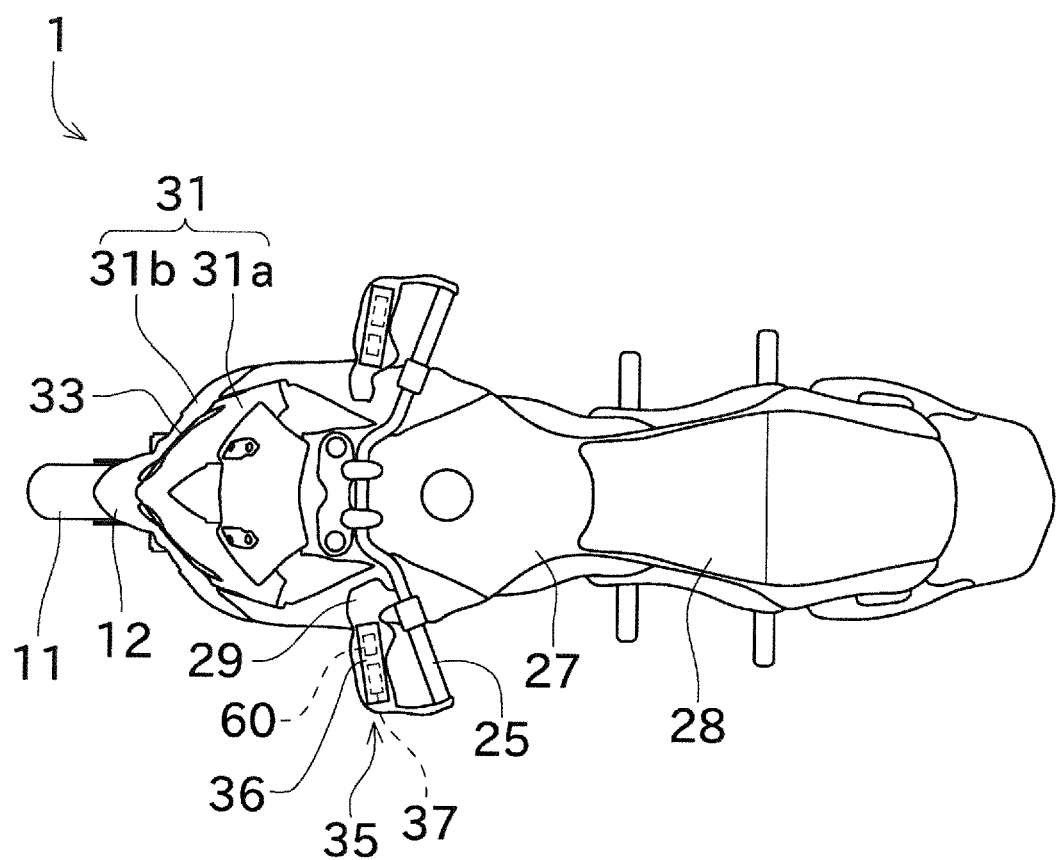
FIG. 6 is a plan view of a motorcycle according to a third embodiment.

A third embodiment will now be described. FIG. 6 is a plan view of a motorcycle according to the third embodiment.

In the third embodiment, hand guards 29 are disposed each covering each grip (to be exact, each covering at least a part of each grip) of the steering handle 25. A direction indicator 35 is disposed in the hand guard 29. The direction indicator 35 includes a light cover 36 and a light emitter 37. A camera unit 60 of the third embodiment is disposed so as to be covered with the direction indicator 35.

In the third embodiment, though attachment positions are different from those in the first embodiment, the advantageous effects described in the first embodiment can be partially exerted. To be specific, the third embodiment can exert the advantageous effects that the waterproof structure, the vibration-proof structure, the countermeasure against light, and the countermeasure against heat, which are provided for the camera unit 60, can be simplified or even omitted.

As thus far described, the motorcycle 1 includes the pair of left and right front forks 21, the headlight 33, the cover members (the side cowls 31a and the light covers 41, 36), and the camera units 60. The front wheel 11 is rotatably attached to the pair of left and right front forks 21. The headlight 33 irradiates the forward side. The cover members are disposed at least laterally outside the pair of left and right front forks 21 in a front view. The cover members respectively have internal spaces. Each of the camera units 60 detects the forward side by acquiring visible light which is one kind of electromagnetic waves (i.e., by acquiring an image). In a front view, the camera units 60 are disposed below the headlight 33 and laterally outside the pair of left and right front forks 21. The camera units 60 are disposed in the internal spaces of the cover members.

Accordingly, a region that is below the headlight 33 and laterally outside the front forks 21 can be effectively used to arrange the camera units 60. Since the camera units 60 are disposed in the internal spaces of the cover members, the camera units 60 can have just a simplified or even no waterproof structure. Particularly for the motorcycle 1, which has its many portions exposed to the outside, the waterproof structure is of great necessity and significance, and therefore this configuration exerts higher effectiveness.

The motorcycle 1 according to any of the above-described embodiments includes the lighting equipment (the cornering lights 40, the direction indicators 35) that is provided separately from the headlight 33. The lighting equipment includes the light emitters 37, 42, and the light covers 36, 41 that cover the light emitters 37, 42. The light covers 36, 41 correspond to the cover members.

Since the lighting equipment has high waterproofness, its waterproof structure can be used to waterproof the camera unit 60.

The motorcycle 1 according to any of the above-described embodiments includes the side cowls 31a each disposed on a side of the vehicle body. Each of the light covers 41 includes the lens 41b that allows light to be transmitted therethrough. The lighting equipment is covered with the side cowl 31a such that the lens 41b is exposed from the side cowl 31a.

Accordingly, the internal space of the side cowl 31a can be effectively used. Moreover, in a portion covered with the side cowl 31a, the waterproof structure for the lighting equipment and the camera unit 60 can be simplified or omitted.

In the motorcycle 1 according to any of the above-described embodiments, the lighting equipment is the cornering light 40 that starts to be turned on when the vehicle body is tilted.

The cornering light 40, which is not always on, is less likely to generate heat. Accordingly, this configuration can reduce heat transferred to the camera unit 60, as compared with a configuration having the camera unit 60 disposed in the headlight 33.

The motorcycle 1 according to any of the above-described embodiments includes the controller 50 that performs the vehicle body controls based on detection results obtained by the camera units 60. The cornering lights 40 are turned on when the vehicle body is tilted about its front-rear direction as a rotation axis. While the vehicle body is tilted so that the cornering lights 40 are turned on, the controller 50 does not perform the vehicle body controls based on detection results obtained by the camera units 60.

While the vehicle body is tilted, the vehicle body controls are not performed based on detection results obtained by the camera units 60. Thus, even if light of the cornering lights 40 entered the camera units 60, it would not affect the vehicle body controls. Accordingly, the cornering light 40 can have a simplified structure, or the camera units 60 can be given an increased degree of freedom in layout.

In the motorcycle 1 according to any of the above-described embodiments, the camera units 60 are disposed below the light emitters 42 of the cornering lights 40.

Since the camera units 60 are disposed below the light emitters, the light emitters 42 of the cornering lights 40 are at high positions and therefore likely to irradiate a far location at a time of turning.

In the motorcycle 1 according to any of the above-described embodiments, the lighting equipment is the direction indicator 35.

The direction indicator 35, which is not always on, is less likely to generate heat. Accordingly, this configuration can reduce heat transferred to the camera unit 60, as compared with a configuration having the camera unit 60 disposed in the headlight 33.

In the motorcycle 1 according to any of the above-described embodiments, the power cable 45 is connected to the light cover 36, 41, the power cable being configured to supply electric power to both the lighting equipment and the camera unit 60.

Accordingly, electric power can be supplied to two devices by using the one power cable 45. This makes wiring simple.

In the motorcycle 1 according to any of the above-described embodiments, the camera units 60 comprise the pair of left and right camera units 60 that are disposed with the pair of left and right front forks 21 laterally interposed therebetween.

Accordingly, the forward side can be detected over a wide lateral range.

In the motorcycle 1 according to any of the above-described embodiments, the cornering lights 40 comprise the pair of left and right cornering lights 40 that are disposed with the pair of left and right front forks 21 laterally interposed therebetween. The camera units 60 comprise the pair of left and right camera units 60 that are disposed with the pair of left and right front forks 21 laterally interposed. During straight traveling, a distance to an object ahead is measured based on detection results obtained by the pair of left and right camera units 60.

In this manner, it is preferable that a pair of left and right cornering lights 40 are provided corresponding to left turn and right turn, respectively. This can be useful for arranging the pair of left and right camera units 60. During turning, a distance to an object ahead need not be measured, and therefore an influence that light of the cornering lights 40 has on the camera units 60 can be ignorable. In addition, since no light-blocking member is disposed ahead of the cornering lights 40, an image (visible light) acquired by each camera unit 60 is hardly interrupted.

The motorcycle 1 according to any of the above-described embodiments includes: the lighting equipment (the cornering lights 40, the direction indicators 35); and the camera unit 60. The lighting equipment comprises a pair of left and right lighting equipment each including the light emitter 42, 37 and the light cover 41, 36 that covers the light emitter 42, 37. The camera unit 60 comprise a pair of left and right camera units 60 each covered with the light cover 41, 36 and each configured to detect the forward side by acquiring visible light which is one kind of electromagnetic waves.

While some preferred embodiments of the present invention have been illustrated above, the above configurations can be modified, for example, as follows.

In the above-described embodiments, the camera unit 60 that acquires visible light (one kind of electromagnetic waves) is illustrated as an example of the forward detector. Alternatively, a measuring instrument different from the camera unit 60 can be employed as long as the measuring instrument is able to detect the forward side (a situation ahead, an object existing ahead, etc.) by acquiring sounds or electromagnetic waves. For example, the forward detector may be a sonar. The sonar transmits ultrasonic waves to the outside, and acquires reflected waves (ultrasonic waves) reflected by an object, to detect the direction where the object is present or the distance to the object. Alternatively, the forward detector may be a radar. The radar transmits electromagnetic waves (e.g., infrared rays, millimeter waves, or microwaves) to the outside, and acquires reflected waves (electromagnetic waves) reflected by an object, to detect the direction where the object is present or the distance to the object.

Using the sonar or the radar as the forward detector enables detection of the forward side even under a situation (e.g., at night or in rain) where acquiring an image with a camera is difficult. The sonar is particularly suitable for close-range collision avoidance or the like. The radar, though its characteristics depend on the wavelength of electromagnetic waves it emits or on a radiation range of the electromagnetic waves, is suitable for long-range object detection, for example. A camera is able to identify the type of an object substantially precisely, if the image recognition accuracy of the camera is increased. This is why the camera is suitable for an object-type identification process. Different types of forward detectors have different characteristics. Thus, a combination of more than one type of forward detectors may be adoptable. For example, more than one type of forward detectors may be disposed in the housing 41a of the cornering light 40.

Although any of the above-described embodiments has the pair of left and right camera units (forward detectors) 60, it may be acceptable that only one of the left and right camera units 60 is disposed. The sonar or the radar, even when it is disposed solely, is capable of measuring the distance to an object ahead. The camera, when disposed solely, is not capable of measuring to the distance to an object ahead, but is capable of detecting the type of an object existing ahead, the size of the object, a change in the size of the object, and the like, and thus is capable of detecting information used for the vehicle body controls.

In the first embodiment, the camera units (forward detectors) 60 are disposed in the cornering lights 40, and the cornering lights 40 are disposed in the side cowls 31a. Instead of this configuration, the camera units 60 may be directly disposed in the side cowls 31a. To be specific, surfaces of the side cowls 31a may be partially opened so that lenses of the camera units 60 and the like can be disposed in the openings. This configuration also does not absolutely require a waterproof structure except for exposed portions of the camera units 60, and thus can exert the advantageous effects of the present invention. The first embodiment may be alternatively configured such that the cornering lights 40 are not covered with the side cowls 31a. In other words, portions (e.g., the housings 41a) of the cornering lights 40 other than the lenses 41b may be exposed to the outside. Such a structure requires a waterproof structure for the entire cornering lights 40, but does not absolutely require a waterproof structure for the camera units 60 which are disposed inside. Accordingly, the advantageous effects of the present invention can be exerted. This variation is applicable not only to the first embodiment but also to the second and third embodiments.

In the above-described embodiments, the cornering lights 40 and the direction indicators 35 are disclosed as the lighting equipment in which the camera units (forward detectors) 60 are disposed. The same structure is applicable to other lighting equipment such as a fog lamp.

The technique related to a forward detector such as the camera unit 60 described in the above-described embodiments is applicable to various types of motorcycles including naked types, off-road types, super-sport types, tourer types, cruise types, scooter types, and the like.

What is claimed is:

1. A motorcycle, comprising:
   a pair of left and right front forks to which a front wheel is rotatably attached;
   a headlight irradiating a forward side;
   a cover member disposed at least laterally outside the pair of left and right front forks in a front view, the cover member having an internal space; and
   at least one forward detector configured to detect sounds or electromagnetic waves forward of the motorcycle,
   wherein, in a front view, the at least one forward detector is disposed below the headlight and laterally outside the pair of left and right front forks, and
   wherein at least one the forward detector is disposed in the internal space of the cover member.

2. The motorcycle according to claim 1, further comprising:
   at least one lighting equipment provided separately from the headlight,
   wherein the at least one lighting equipment includes at least one light emitter and the cover member also covers the at least one light emitter, and
   wherein the cover member serves as a light cover.

3. The motorcycle according to claim 2, further comprising:
   a side cowl disposed on a side of a vehicle body,
   wherein the light cover includes a transmissive portion that allows light to be transmitted therethrough, and
   wherein the at least one lighting equipment is covered with the side cowl such that the transmissive portion is exposed from the side cowl.

4. The motorcycle according to claim 2, wherein the at least one lighting equipment is a cornering light that turns on when a vehicle body is tilted.

5. The motorcycle according to claim 4, further comprising:
   a controller performing a vehicle body control based on a detection result obtained by the at least one forward detector,
   wherein the cornering light is turned on when the vehicle body is tilted about its front-rear direction as a rotation axis, and
   wherein while the vehicle body is tilted and the cornering light is on, the controller does not perform the vehicle body control based on a detection result obtained by the at least one forward detector.

6. The motorcycle according to claim 4, wherein the at least one forward detector is disposed below the light emitter of the cornering light.

7. The motorcycle according to claim 4, wherein the at least one cornering light comprises a pair of left and right cornering lights that are disposed with the pair of left and right front forks laterally interposed therebetween,
   wherein the at least one forward detector comprises of a pair of left and right camera units that are disposed with the pair of left and right front forks laterally interposed therebetween, and
   wherein during straight traveling, a distance to an object ahead is measured based on detection results obtained by the pair of left and right camera units.

8. The motorcycle according to claim 2, wherein a power cable is connected to the light cover, the power cable being configured to supply electric power to both the at least one lighting equipment and the at least one forward detector.

9. The motorcycle according to claim 2, wherein the at least one lighting equipment is a direction indicator.

10. The motorcycle according to claim 1, wherein the at least one forward detector comprises a pair of left and right forward detectors that are disposed with the pair of left and right front forks laterally interposed therebetween.

11. The motorcycle according to claim 1, wherein the at least one forward detector is a camera unit.

* * * * *